United States Patent [19]
Caldwell

[11] 4,353,248
[45] Oct. 12, 1982

[54] WELL LOGGING TO DETERMINE THE NATURE AND EXTENT OF MUD FILTRATE PENETRATION

[75] Inventor: Richard L. Caldwell, Dallas, Tex.
[73] Assignee: Mobil Oil Corporation, New York, N.Y.
[21] Appl. No.: 219,793
[22] Filed: Dec. 24, 1980
[51] Int. Cl.³ ............................................. E21B 47/00
[52] U.S. Cl. ..................................................... 73/152
[58] Field of Search .................... 73/151, 152; 324/341

[56] References Cited
U.S. PATENT DOCUMENTS 3,893,020  7/1975  Meador et al. ....................... 324/341
4,245,313  1/1981  Coates .................................. 73/152 X

*Primary Examiner*—Jerry W. Myracle
*Attorney, Agent, or Firm*—Charles A. Huggett; Michael G. Gilman; George W. Hager

[57] ABSTRACT

A method of open borehole logging is disclosed which provides a mud filtrate penetration index which is proportional to the degree of mud filtrate invasion causing residual oil removal from the vicinity immediately surrounding the borehole. The present invention utilizes a unique combination of formation density logging, dielectric constant logging and gravity meter measurement techniques to arrive at this mud filtrate penetration index, which may also be used to evaluate the probable reliability of residual oil determinations made by these or other logging techniques.

1 Claim, 1 Drawing Figure

WELL LOGGING TO DETERMINE THE NATURE AND EXTENT OF MUD FILTRATE PENETRATION

BACKGROUND

A. Introduction

The present invention relates to the field of oil well logging, and more particularly, to the field of well logging which is intended to determine the percent of residual oil remaining in borehole adjacent formations which have been subjected to primary and secondary production procedures.

Once primary oil production from a well is complete, it is known to stimulate further well production by forcing water into a pay zone to sweep or flush oil out of that zone. Such production, usually termed "secondary production", may still leave substantial amounts of residual oil in the pay zone. Even after a water flood, it is not unusual for 20–40% of the oil originally contained in the pay zone to remain. In other pay zones, however, much lower residual oil percentages remain after secondary production.

It is important to know the amount of residual oil remaining in a pay zone after a secondary production. Depending on the amount of oil remaining in the pay zone, it may be economical to plan a tertiary flood wherein other fluids are pumped into the well to flush additional amounts of oil from the pay zone. Such tertiary fluids comprise detergents, carbon dioxide, and or oil solvents.

Many techniques have been suggested for making residual oil determinations. These methods include conventional coring, pressure coring, back flow tracing and other logging techniques. For a review of many of these techniques, please refer to "How Should We Measure Residual-Oil Saturation?", by R. E. Wyman, Bulletin of Canadian Petroleum Geology, Vol. 25, No. 2 (May 1977), pages 233–270, which is hereby incorporated by reference. As reviewed by Mr. Wyman, basic logging methods include resistivity, pulsed neutron capture, nuclear magnetism, carbon/oxygen, gamma radiation, and dielectric logging techniques. In another review article entitled "Review of Petroleum Oil Saturation & Its Determination", by E. C. Donaldson and M. E. Crocker, U.S. Dept. of Energy, Technical Information Center, publication #BERC/RI77/15 (distribution category UC 92a), many additional methods of determining residual oil saturation are suggested. In the area of well logging, resistivity, spontaneous potential, focusing electrode, induction, sonic, formation density, neutron, gamma-ray, thermal neutron decay-time, nuclear magnetic, and log-inject-log logging techniques are described. After reviewing the above mentioned techniques and several others, Messrs. Donaldson and Crocker conclude:

"No method for the determination of the residual oil saturation is so general that it can be used in all situations that arise in field operations. Best results are obtained from selected multiple tests in a single hole. Wyman [supra.]... states that the nuclear magnetic log is the most accurate of all of the logging methods; however, its depth of investigation is limited and it can only be used in an open hole. In many respects, the log-inject-log procedure using the neutron capture tool has the most general range of application since it can be used in either cased or uncased wells." Donaldson et al, supra, at page 33.

B. Particular Logging Methods for Determining Residual Oil Concentrations

1. Formation Density Log

Formation density logs are generally used to measure formation porosity. In accordance with this technique, a source of gamma radiation is mounted in a shielded sidewall skid and permitted to irradiate adjacent formations. The gamma rays emitted by the source interact with electrons in the formation, resulting in a scattering of the gamma rays. A detector located above the source counts the back-scattered gamma rays. The intensity of the back-scattered rays is a function of the formation density. Most of the recorded signal comes from a region about 3 inches in depth. See Donaldson & Crocker, supra. at page 31.

A more detailed description of a Schlumberger formation density tool, and methods for using same, are provided in "Schlumberger Log Interpretation-Vol. 1 Principles", Chapter 8, "The Formation Density Log" (1972 Edition) Schlumberger Ltd., 277 Park Ave., N.Y., N.Y. 10017, which chapter is hereby incorporated by reference. As explained in this chapter, a formation density log is often designed to cut through mud caked on the side of a borehole to minimize the effect which that mud cake would otherwise have on porosity readings. Since some mud cake may remain interposed between the logging skid and the formation at greater depths, such cake is usually compensated for through normal correction techniques. As further explained in this chapter, the porosity of formation regions within about 3 inches of the borehole surface is easily determined using the disclosed formation density compensated (FDC) log.

2. Dielectric Constant

As explained by R. E. Wyman, supra, dielectric logging response is dependent upon the dielectric constant of rock and its associated fluids, and is frequency-dependent. Water has a significantly higher constant than oil and common rock types; large water volumes lead to higher dielectric constant reading. These readings are much less sensitive to salinity changes, especially at higher frequencies, than resistivity logs. For these reasons, dielectric constant logging tools may be particularly valuable in open holes to distinguish oil from water that is fresh or of unknown salinity.

Dielectric measurements are strongly dependent on water saturation. At least as of 1977, Wyman concluded that "The uncertainties are too great to permit accurate residual-oil measurements by means of dielectric-constant logging." In "Dielectric Constant Logging, A Salinity Independent Estimation Of Formation Water," volume by R. A. Meador and P. T. Cox, SPE 5504, presented at the fall meeting of the Society of Petroleum Engineers of AIME, Dallas, Tex., (1975) a dielectric constant logging device and method for use in the present invention is described. Accordingly, this paper is hereby incorporated by reference as if fully set forth herein. As described in this paper, the use of a dielectric log can provide a direct estimate of formation water saturation. Additional information on this tool is provided in "Electromagnetic Propagation ... A New Dimension in Logging" by T. J. Calvert, R. N. Rau, and L. E. Wells, SPE 6542, presented at the 47th Annual Calif. Regional Meeting of the Society of Petroleum Engineers of AIME held in Bakersfield, Calif., Apr. 13-15, 1977, which paper is also incorporated by reference as if fully set forth herein. As noted by Calver et al., in formations containing very heavy crude oil or tar, drilling fluids displace very little hydrocarbon, if any. When invasion does occur, filtrate will displace some formation water, but the bulk volume of water remains the same. In such instances, the shallow-reading nature of this tool will respond to formations with the same proportions of hydrocarbon to water as seen by deeper reading devices when immobile hydrocarbon is involved. For other references referring to dielectric constant techniques, please refer to U.S. Pat. No. 3,893,020 (Meador et al) and U.S. Pat. No. 3,944,910 (Rau), each of which patents are hereby incorporated by reference.

3. Borehole-Gravity Meter Techniques

The concept of relating borehole gravity gradients to formation evaluation was proposed as early as 1950. This method relies upon detection of gravity differences between two vertically separated points underground. Borehole gravity meter techniques have been demonstrated to accurately measure bulk densities of large volumes of subsurface rocks independent of borehole and near-borehole conditions. Gravity meter methods may be used to compute porosity using the standard density/porosity relationship. If porosity is known, fluid densities can be computed using gravity meter data.

One borehole gravity meter technique and apparatus is described in "Improved Hydrocarbon Reservoir Evaluation Through Use of Borehole-Gravity Meter Data" by A. H. Jagler, presented at the SPE-AIME 50th Annual Fall Technical Conference & Exhibition, held in Dallas, Sept. 28-Oct. 1, 1975, which paper is hereby incorporated by reference as if fully set forth herein.

SUMMARY OF THE INVENTION

Figure 1:
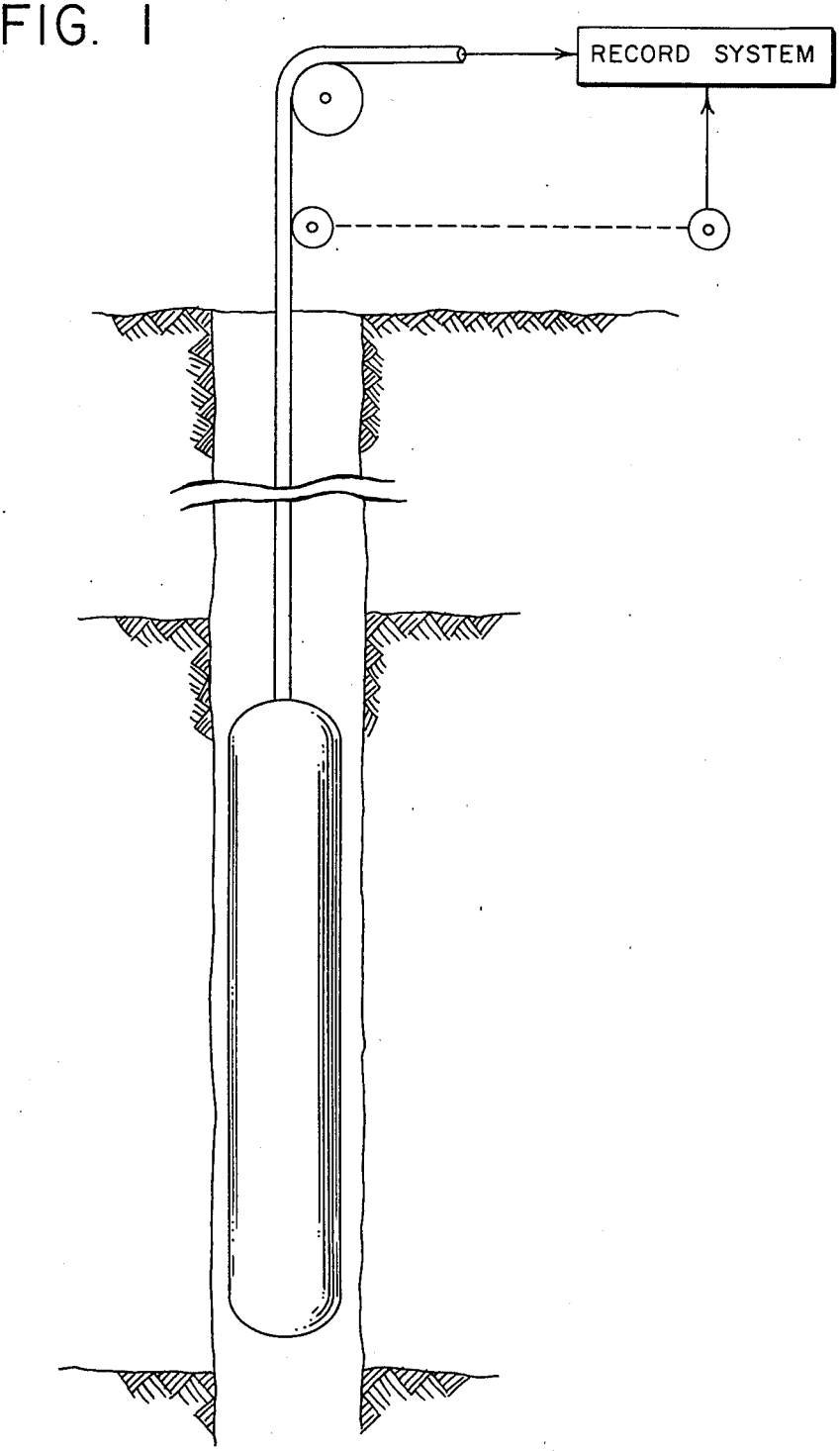
FIG. 1 shows a conventional wall logging means by which the invention is practiced.

The present invention provides a novel method for determining the degree of mud filtrate penetration into a surrounding borehole, at least to the extent that that filtration has resulted in displacement of residual oil which would otherwise be found in that region of filtrate penetration. The present method is useful in an open borehole which is to be evaluated for its secondary or tertiary residual oil potential, and comprises the steps of first determining the porosity of the formation adjacent to the borehole, determining the dielectric constant of the formation adjacent to the borehole, and determining the gravitometric bulk density of the formation adjacent to the borehole. Then, using the aforementioned porosity determination, a near zone theoretical percentage of residual oil is determined which is based upon the dielectric constant determined for the surrounding formations. A far zone theoretical residual-oil percentage is also determined using the aforementioned porosity measurement and the gravitometric bulk density reading. A near formation to far formation residual oil ratio is then established to provide a relative mud filtrate invasion index which is proportional to the residual oil displacing distance of said invasion, whereby the distance of said invasion decreases as said index approaches unity.

As a result, an extremely simple logging method is disclosed for determining the effect which mud filtrate penetration has had upon residual oil in the immediate vicinity of the borehole.

Accordingly, a primary object of the present invention is the provision of a novel method for determining the degree of residual oil displacement resulting from mud filtrate invasion into the vicinity immediately around the borehole.

Another object of the present invention is the provision of a method which improves the reliability of residual oil determinations in open boreholes proposed for secondary or tertiary recovery efforts.

These and other objects of the present invention will become apparent from the following more detailed description.

DESCRIPTION OF THE PREFERRED EMBODIMENTS

The present invention provides a novel residual oil-water logging method which takes advantage of many of the characteristics of formation density compensated logging devices, dielectric constant logging devices and gravity meter measurement apparatus.

In accordance with the preferred method of the present invention, a formation density compensated log is run in a given section of borehole to determine the porosity of the formation, water-filled. The depth of investigation of the formation density log is only a few inches, so that it "sees" only water-saturated rock. The density of the water, which is normally mud filtrate, is known or can be readily determined by taking a sample of the mud. The preferred formation compensated logging tool for use in performing the method of the present invention is the tool disclosed in the Schulumberger formation density log chapter referenced above.

The porosity determination of this FDC tool is used to provide a volume-percent value which indicates the relative proportion of rock to fluid. Due to the shallow depth of investigation of an FDC log, it may be assumed that no residual oil remains in the pores of the formation within several inches of the borehole surface. In succeeding steps of the preferred embodiment method, the porosity determination of the FDC log will be used for all purposes, that is, it will be assumed that the porosity of the formation under investigation is horizontally homogeneous.

Next, using the FDC porosity values, a dielectric constant log is run to determine the residual oil saturation in the "near" zone. "Near" as used in this patent application means within the depth of investigation of the dielectric constant tool, which is said to be within "several feet" by the originators of the tool at the Texaco laboratory. The preferred embodiment dielectric constant tool, and method for using same, is the tool which is described in the aforementioned papers of Richard Neador et al and T. J. Calvert.

Preferably, a borehole gravity meter determination is then performed to obtain the bulk density of a large volume of rock which is saturated with residual oil plus, in most cases, salt water. The depth of investigation of such a borehole gravity technique is at least tens of feet. As such, gravity meter measurements are substantially unaffected by even the deepest of mud filtrate invasions. Since porosity is assumed to be as measured by the formation density compensated log, the bulk fluid density, and thus the theoretical percentage of residual oil in the "far zone" of investigation is readily ascertained.

If the depth of mud filtrate invasion is shallow, that is, within a matter of inches, then the theoretical percentages of residual oil will be close to the same for both the near zone and far zone of investigation. If the mud filtrate invasion is beyond the depth of investigation of the dielectric constant tool measurement, then the borehole gravity meter determination will show a much lower bulk density (rock+fluid) than the region investigated by the dielectric constant tool. Stated differently, by establishing a ratio of residual oil saturation for the near zone as determined by the dielectric constant tool, and the far zone as determined by the gravity meter device an index is established which is proportional to the depth of mud filtrate invasion, at least to the extent that that invasion has caused residual oil to be displaced.

The index of mud filtrate invasion will prove particularly useful in evaluating other measurements of varying investigational depth which may be proposed for use on a given borehole. Log-inject-log techniques or other techniques which are likely to be affected by extreme depths of mud filtrate invasion may accordingly, be contraindicated under certain circumstances. The present invention further provides a convenient method for confirming the reliability of residual oil-water determinations made by a dielectric constant tool.

What is claimed is:

1. A method for determining the depth of invasion of residual oil-displacing mud filtrate in an uncased portion of a borehole of a well to be evaluated for its secondary or tertiary residual oil recovery potential, comprising the steps of:
   (a) logging said borehole with a formation density compensated logging tool for determining the porosity of the formation which is within several inches of the inner surface of said borehole;
   (b) logging said borehole with a dielectric constant logging tool to determine the dielectric constant of the formation with a near zone located around said borehole;
   (c) subjecting said borehole to an in-hole gravity meter test to determine the bulk density of the formation within a far zone adjacent to said borehole;
   (d) using the porosity determination of step (a) above and the dielectric constant value determined from step (b) above to determine a theoretical percentage of residual oil present within said near zone;
   (e) using the porosity determination from step (a) above and the gravitometric bulk density of the far zone formation determined from step (c) above to calculate a theoretical percentage of residual oil for said far zone;
   (f) establishing a near zone to far zone residual oil ratio to provide a relative mud filtrate invasion index which is proportional to the distance of said mud filtrate invasion, whereby the depth of said invasion decreases as said index approaches unity.

* * * * *